United States Patent [19]

Atterbury

[11] 4,415,309
[45] Nov. 15, 1983

[54] GAS TURBINE ENGINE SEAL

[75] Inventor: Leslie G. Atterbury, Herts, England

[73] Assignee: Rolls-Royce Limited, London, England

[21] Appl. No.: 235,158

[22] Filed: Feb. 12, 1981

[30] Foreign Application Priority Data

Mar. 1, 1980 [GB] United Kingdom ............... 8007039

[51] Int. Cl.³ .................. F04D 29/08; F02F 11/00
[52] U.S. Cl. ................. 415/170 R; 416/174; 277/38; 277/53
[58] Field of Search .......... 415/170 R, 172 R, 172 A, 415/174; 277/38, 39, 53, 236; 405/147; 49/475; 139/425 R, 397; 416/174

[56] References Cited

U.S. PATENT DOCUMENTS

| 885,032 | 4/1908 | Ferranti | 415/172 A |
|---|---|---|---|
| 1,307,008 | 6/1919 | Hutchins | 139/397 |
| 2,797,469 | 7/1957 | Kahn | 139/425 RX |
| 2,866,255 | 12/1958 | Keen | 139/397 X |
| 3,519,282 | 7/1970 | Davis | 415/172 AX |
| 3,537,713 | 11/1970 | Matthews et al. | 415/174 X |
| 3,838,983 | 10/1974 | Brown et al. | 139/425 RX |
| 4,063,742 | 12/1977 | Watkins Jr. | 277/53 |
| 4,095,005 | 6/1978 | Kishida et al. | 415/170 RX |

FOREIGN PATENT DOCUMENTS

| 2344666 | 9/1972 | Fed. Rep. of Germany | 277/53 |
|---|---|---|---|
| 1541001 | 2/1975 | United Kingdom | 277/53 |
| 2051962 | 1/1981 | United Kingdom | 415/174 |

Primary Examiner—Harvey C. Hornsby
Assistant Examiner—Shewen Bian
Attorney, Agent, or Firm—Cushman, Darby & Cushman

[57] ABSTRACT

A gas turbine engine is provided with an annular sealing element which is adapted to provide a gas seal between relatively rotatable gas turbine components. The sealing element is in the form of a woven fabric which has metallic warp filaments, metallic weft filaments and metallic warp pile filaments. The free ends of the warp pile filaments are non-looped. The sealing element is brazed to one of the gas turbine engine components so that the free ends of the warp pile filaments abut the other gas turbine engine component in sealing engagement.

8 Claims, 4 Drawing Figures

GAS TURBINE ENGINE SEAL

This invention relates to gas turbine engine seals and in particular to annular seals between relatively rotatable components of a gas turbine engine.

In order to ensure efficient operation, it is necessary to provide gas seals between various relatively rotatable components in gas turbine engines. Such seals of this type are required to operate under conditions of high temperature and pressure, they must be capable of withstanding such conditions for prolonged time periods without failing or losing their effectiveness.

Several seal designs have been proposed in the past but each has disadvantages. For instance, rubbing seals, whilst providing efficient sealing at low speeds, are unsuitable for use at the high speeds encountered in gas turbine engines. The seals usually overheat at high speeds, sometimes resulting in seal destruction. An alternative solutions has been to provide one element of the seal with an abradable coating which is adapted to be worn away by the other seal element. However, whenever contact occurs between the seal elements, too much abradable material can be worn away so that the seal gap eventually increases with an attendant decrease in sealing efficiency.

An alternative solution to the sealing problem is disclosed in U.K. Pat. No. 1,450,553. In that patent there is described a seal element which is in the form of a plurality of metallic filaments clamped at one end so that their free ends engage a second seal element which is in the form of a smooth annular surface. Whilst such seal elements provide effective sealing, they are sometimes unsuitable for use in confined locations. Thus since the filaments are clamped together, the bulk of the clamping member can, in confined locations, occupy a large proportion of the gap across which sealing is required. This consequently results in a necessary reduction in free filament length which leads in turn to an impairment of their sealing efficiency.

It is an object of the present invention to provide a seal element which substantially avoids these disadvantages and is suitable for use in confined locations.

According to the present invention, a gas turbine engine is provided with a seal adapted to provide a gas seal between first and second relatively rotatable annular gas turbine engine components, said seal comprising an annular element attached to the first of said engine components and consisting of a woven fabric having metallic warp filaments, metallic weft filaments and metallic warp pile filaments, said warp pile filaments having free ends which are non-looped, said annular seal element being attached to said first engine component in such a manner that the non-looped free ends of said metallic warp pile filaments abut said second engine component in sealing engagement.

Said annular seal element may be attached to said first engine component by brazing.

Said metallic filaments constituting said woven fabric are preferably in the form of a lightly twisted yarn.

The lightly twisted yarn of each of said warp, weft and warp pile may be made up of eight metallic filaments.

Said annular seal element may be woven from a plurality of filaments of a nickel base alloy.

Alternatively said annular seal element may be woven from a plurality of filaments of stainless steel.

Said warp pile filaments are preferably all inclined to said first of said components in the same direction.

According to a further aspect of the present invention, a method of manufacturing a seal element and attaching that seal element to an annular surface of a gas turbine engine component comprising weaving a fabric having metallic warp filaments, metallic weft filaments and a metallic warp pile, said warp pile filaments having free ends which are non-looped, at least some of said warp and weft metallic filaments being of a brazing alloy, applying said fabric to said annular surface of a gas turbine engine component such that said warp and weft filaments are adjacent said engine component surface and heating said fabric to melt said brazing alloy and bond said fabric to said engine component surface.

Said fabric is preferably retained in position on said annular surface during brazing by means adapted to incline said warp pile filaments to said annular surface, all of said filaments being inclined in the same direction, sufficient brazing alloy being present to retain said warp pile filaments in said inclined position after brazing.

The invention will now be particularly described with reference to the accompanying drawings in which.

Figure 1:
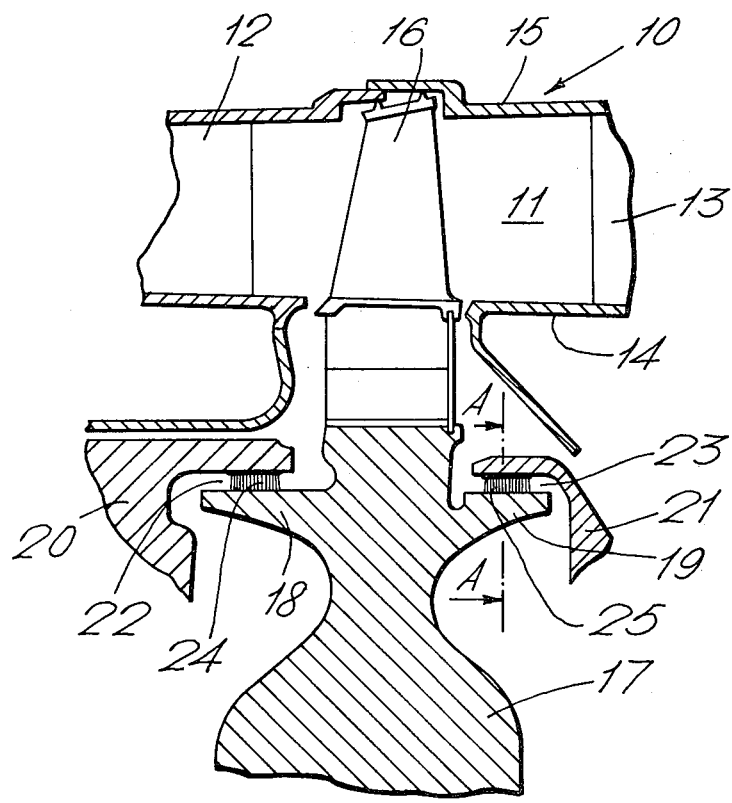
FIG. 1 is a sectioned side view of part of the turbine of a gas turbine engine in accordance with the present invention.

With reference to FIG. 1, an axial flow turbine 10 of a gas turbine engine (not shown) is provided with alternate annular arrays of stator and rotor aerofoil blades which are positioned in an annular gas passage 11. The stator aerofoil blades, portions of two of which 12 and 13 can be seen in the drawings, span the gap between the radially inner and outer walls 14 and 15 respectively of the gas passage 11. The rotor blades, one of which 16 can be seen in the drawing, are mounted on rotary discs which are adapted to drive the compressor of the gas turbine engine via a suitable shaft (not shown).

The disc 17 on which the rotor blade 16 and a plurality of similar blades (not shown) are mounted, is provided with two opposed axially extending annular flanges 18 and 19. The flanges 18 and 19 cooperate with annular stator portions 20 and 21 respectively of the turbine 10 to define gaps 22 and 23 which are bridged by annular sealing elements 24 and 25.

Figure 2:
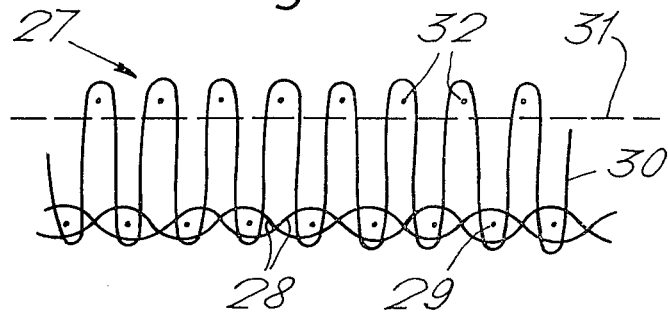
FIG. 2 is a diagrammatic illustration of one form of manufacture of the seal elements of the turbine shown in FIG. 1.

Each of the sealing elements 24 and 25 consists of a fabric 27 which is woven from metallic filaments. The metallic filaments are in the form of a spun yarn and are woven into a fabric which is generally in the form of a velvet. Thus the fabric, as can be seen at 27 in FIG. 2, comprises metallic warp filaments 28, metallic weft filaments 29 and metallic warp pile filaments 30. The fabric 27 is woven in the same manner as a velvet. However since it consists of metallic filaments, we find that instead of cutting the looped warp pile filaments 30 as is the case with velvet manufacture from conventional textile materials, it is more convenient to grind the loop warp pile 30 down to the level of the interrupted line 31 after the wires 32 supporting the free ends of the loop warp pile 30 have been removed.

After weaving and removal of the looped ends of the warp pile filaments 30, the fabric 27 is attached to the annular stator turbine portions 20 and 21 by brazing although it will be appreciated that other methods of attachment could be employed. There are several possible ways in which brazing could be carried out. For instance, a ribbon of brazing alloy may be interposed between the warp 28 and weft 29 filaments of the fabric 27 and the stator turbine portions 20 and 21. The application of heat then melts the brazing alloy and bonds the fabric to the stator portions 20 and 21. An alternative and preferred method is to incorporate at least some warp and weft metallic filaments 28 and 29 into the woven fabric 27 which are formed from a brazing alloy. The fabric 27 is then placed upon the stator portions 20 and 21 so that the warp and weft filaments 27 and 28 are adjacent thereto and heat is applied to melt the brazing alloy and bond the fabric 27 to the stator portions 20 and 21. This method has the advantage of providing accurate control over the amount of brazing alloy available for bonding so that any tendency for excess molten braze alloy to be drawn into the warp pile 30 by capillary action may be countered.

We have found it preferable to utilise a suitably shaped tapered mandrel in retaining the fabric 27 in position on the stator portions 20 and 21 during brazing. In addition to ensuring that the fabric 27 is retained in position, it also enables control to be exerted over the angle at which the warp pile filaments 30 are inclined to the stator portions 20 and 21. Thus we have found it desirable to position the mandrel so that during brazing the filaments are inclined at an angle of up to 30° to the stator portions 20 and 21 in the direction of rotation of the flanges 18 and 19.

Figure 3:
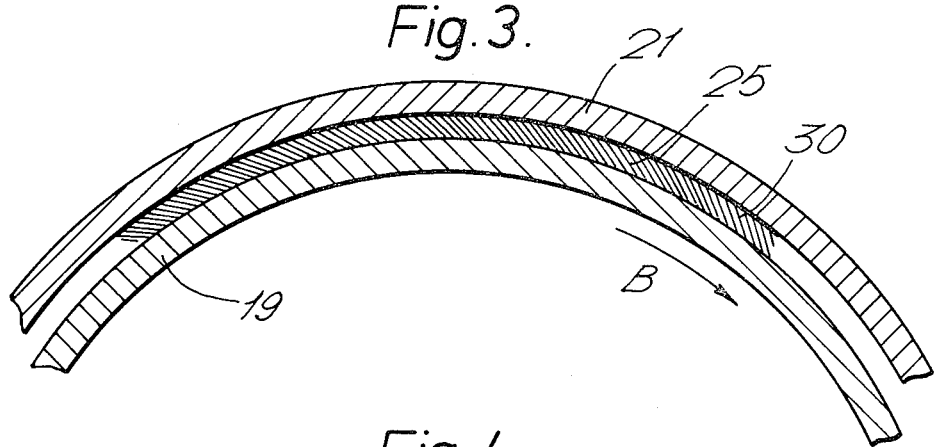
FIG. 3 is a view on line A—A of FIG. 1.

The brazing alloy, when cool, retains the warp pile filaments 30 in this configuration. Inclination of the warp pile filaments 30 in this manner compensates in use for seal wear and ensures that all of the warp pile filaments 30 make contact with their respective flanges 18 and 19. The inclination of the warp pile filaments can be seen in FIG. 3 where the arrow B indicates the direction of rotation of the disc 17.

Figure 4:
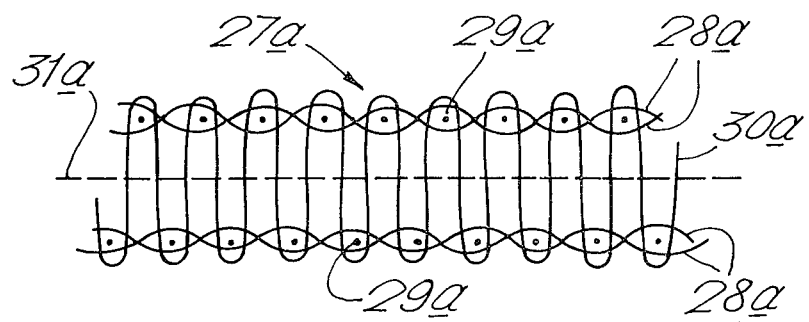
FIG. 4 is a diagrammatic illustration of an alternative form of manufacture of the seal elements of the turbine shown in FIG. 1.

Other conventional methods may be used for weaving the fabric 27. Thus for instance the woven fabric 27a shown in FIG. 4 comprises one set of warp pile filaments 30a which is common to two sets of warp 28a and weft 29a filaments. After weaving, the two sets of warp 28a and weft 29a are separated by cutting along the interrupted line 31a. Alternatively one of the warp 28a and 29a sets may be ground away to expose the warp pile filaments 30a.

The sealing elements 24 and 25 are, as previously stated, bonded to annular surfaces on the turbine stator portions 20 and 21 so that they in turn adopt a similar annular configuration. They are mounted on the turbine stator portions 20 and 21 so that the warp pile filaments 30 extend across the gaps 22 and 23 so that their free ends engage the annular surfaces of the disc flanges 18 and 19. The warp pile filaments 30 thus provide gas seals between the turbine stator portions 20 and 21 and the disc 17. Consequently the gases which pass in operation through the gas passage 11 are prevented from leaking into the radially inner regions of the turbine 10 and thus impairing its efficiency.

It will be appreciated that the gases which pass through the gas passage 11 are of high temperature. For this reason, the metal filaments which make up the fabric 27 must be of an alloy which has suitable temperature resistance. Thus depending on the ambient temperature in which they are required to operate, the filaments which constitute the warp 28, weft 29 and warp pile 30 may be formed from, for instance, a nickel base alloy such as Nimonic 90 or stainless steel.

In addition to being at high temperature, the gases passing through the gas passage 11 are also at high pressure. A convenient fabric 27 to withstand these conditions is formed from stainless steel filament lightly twisted yarn, each twisted yarn comprising 8 stainless steel filaments which are 0.0014 inches thick. Such a fabric 27 is effective in providing a gas seal across a gap which is ⅛ inch wide. It will be appreciated however that sealing elements in accordance with the present invention may be made up of filaments of other diameters depending upon the particular application of the sealing element and that the warp pile filaments may be appropriately dimensioned to provide sealing across gaps of other widths.

It will be seen therefore that sealing elements in accordance with the present invention are particularly advantageous in gas turbine engines which are of compact dimensions. Thus since no clamping member is required to hold the warp pile filaments together, the sealing element may be placed in comparatively small gaps.

I claim:

1. A gas turbine engine provided with a seal for providing a gas seal between first and second relatively rotatable annular gas turbine engine components, said seal comprising an annular element attached to the first of said components and consisting of a woven fabric having metallic warp filaments, metallic weft filaments and metallic warp pile filaments, said warp pile filaments having free ends extending from one surface of said woven fabric and which are non-looped and looped ends forming part of another surface of said woven fabric, and means directly attaching said another surface of said woven fabric of said annular seal element including said warp filaments, said weft filaments and said looped ends of said warp pile filaments directly to said first engine component so that the non-looped free ends of said metallic warp pile filaments extending from the one surface of said woven fabric abut said second engine component in sealing engagement, said means including forming at least some of said metallic filaments from a brazing alloy to permit the at least some of said filaments formed of the brazing alloy to be directly brazed to said first engine component thereby preventing capillary flow of the brazing alloy into the warp pile filaments.

2. A gas turbine engine as claimed in claim 1 wherein said metallic filaments constituting said fabric are in the form of a lightly twisted yarn.

3. A gas turbine engine as claimed in claim 2 wherein the lightly twisted yarn of each of said warp, weft and warp pile is made up of eight metallic filaments.

4. A gas turbine engine as claimed in claim 1 wherein said annular seal element is woven from a plurality of filaments of a nickel base alloy.

5. A gas turbine engine as claimed in claim 1 wherein said annular seal element is woven from a plurality of filaments of a stainless steel.

6. A gas turbine engine as claimed in claim 1 wherein said warp pile filaments are all inclined to said first of said components in the same direction.

7. A method of manufacturing a seal element and attaching the seal element directly to an annular surface of a gas turbine engine comprising weaving a fabric having metallic warp filaments, metallic weft filaments and metallic warp pile filaments, said warp pile filaments being non-looped at their free ends and extending from one surface of said fabric, at least some of said warp, weft and/or warp pile metallic filaments being of a brazing alloy, applying another surface of said fabric directly to said annular surface of a gas turbine engine component so that said warp, weft and warp pile filaments are adjacent said engine component surface, and heating said fabric to melt said at least some of said warp, weft and/or warp pile filaments of said brazing alloy and bond said fabric directly to said engine component surface without capillary flow of said brazing alloy into the warp pile filaments.

8. A method of maufacturing a seal element as claimed in claim 7 wherein said fabric is retained in position on said annular surface during brazing by means adapted to incline said warp pile filaments to said annular surface, all of said filaments being inclined in the same direction, sufficient brazing alloy being present to retain said warp pile filaments in said inclined position after brazing.

* * * * *